Oct. 7, 1958     J. CAPARROS     2,854,753

MEASURING IMPLEMENT

Filed March 22, 1954

INVENTOR
JOSE CAPARROS
BY
William F. Nickel
ATTORNEY

United States Patent Office 2,854,753
Patented Oct. 7, 1958

2,854,753
MEASURING IMPLEMENT
Jose Caparros, Santiago, Chile
Application March 22, 1954, Serial No. 417,778
1 Claim. (Cl. 33—139)

My invention is an improved measuring implement; especially a measuring implement having a ribbon or strip of tape and a casing with a reel therein for winding up the ribbon in the casing and permitting it to be drawn out when needed.

An important object of the invention is to provide a casing for a measuring ribbon having a counter or indicator attached to show the length of the tape or ribbon that is pulled out. The ribbon has no numbers thereon but is shaped so that the ribbon operates the indicator as it leaves the casing and restores the parts of the indicator to starting position as it is drawn back into the casing.

Other objects and the advantages of the invention are fully described in the ensuing description and the novel features are defined in the appended claim. The drawings illustrate an embodiment of the implement, but the disclosure is explanatory only and variations may be adopted in the structure actually shown without deviation from the essential design in which the invention resides.

Figure 1:
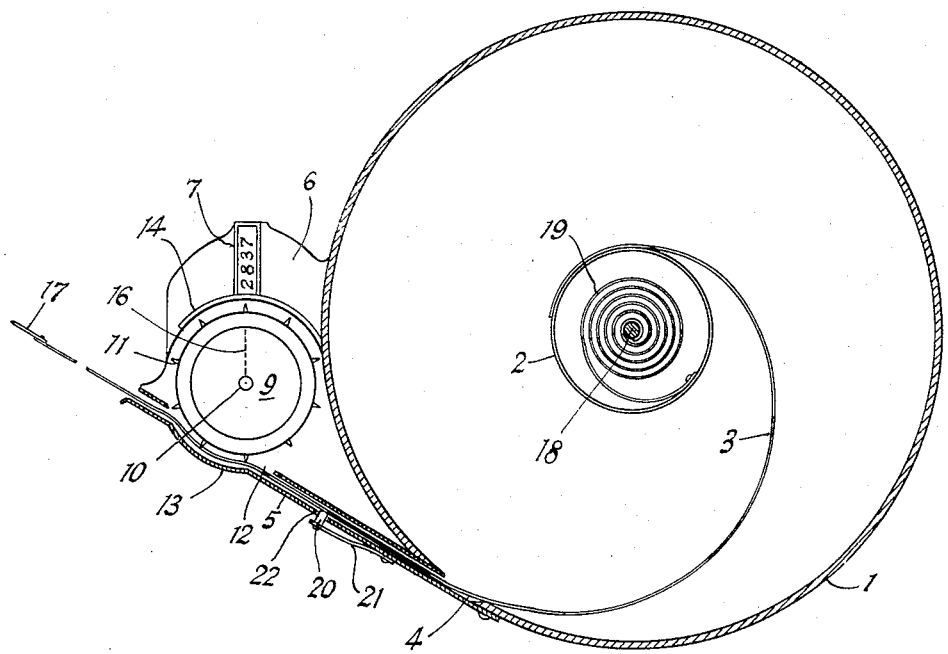
Figure 2:
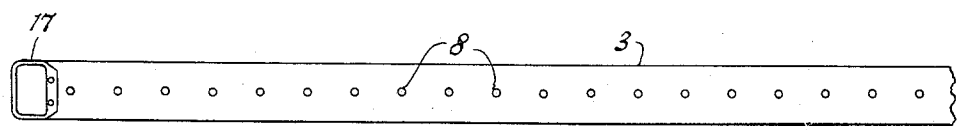
Figure 3:
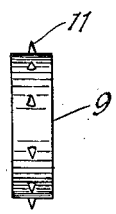

On the drawings:

Figure 1 is a section through a measuring implement according to my invention; and Figures 2 and 3 show details of construction.

The casing of the usual round form has a wind-up reel 2 rotatably mounted therein, and one end of a ribbon or tape 3 is made fast to the reel 2. The casing has an opening 4 in its rim through which the ribbon 3 passes. In line with the opening 4 is a flat guideway 5 secured in tangential position wtih respect to the rim of the casing and in line with the opening 4, the passageway through this guide being wide enough and low enough to conform to the shape of the ribbon and envelope it loosely enough to permit free movement of the ribbon through the guide 5. A web 6 connects one side of the guide 5 to the casing 1 and holds it firmly so that it will not be bent or displaced with handling. The web supports an indicator 7 which shows how much of the tape is pulled out. This indicator is of well known construction, with either a dial or separate disks bearing numbers which are exposed to give the reading and is not part of my invention.

The ribbon has no numbers thereon, but a row of apertures 8, spaced apart an inch or a centimeter or fraction thereof. These apertures or perforations engage a wheel or disk 9, mounted on a rotatable shaft 10, supported in a suitable bearing on the web 6, and having spurs or projections 11 on its circumference as far apart from one another as the perforations 8. The guide 5 has an opening 12 on one side which exposes the ribbon or tape to the spur wheel 9, and the other or outer face has a curved bulge 13 opposite the aperture 12. When the tape or ribbon 3 is pulled out the perforations 8 engage the spurs 11 on the wheel 9 to the best advantage and rotate the wheel to actuate the indicator 7. The wheel along its rim between the outer end of the guide 5 and casing 1 is not exposed, but is screened by a curved flange or guard 14 which is carried by the web 6. The connection between the shaft 10 which is turned by the wheel to transmit motion to the indicator 7 is shown diagrammatically by the numeral 16.

The outer end of the ribbon 8 has a loop 17 by which it can be seized. A fixed journal 18 in the casing 1 rotatably supports the reel 2, and within the reel is a spring 19, fixed to the reel at one end and to the journal at the other and set so that it tends to pull the ribbon 8 into the casing and coil it up on the reel 2. The spring permits the ribbon 8 to be drawn out at full length.

When a measurement is to be made, the tape is pulled and then the spur wheel 9 can be held by a finger pressed against its side to hold the wheel stationary till the indicator is read. If desired a brake comprising, for example, a stud 20 at the end of a leaf spring 21, affixed to the outer face of the guide 5 can be utilized. The stud 20 lies in an aperture 22 in the guide 5 and is held by the elastic member or spring 21 out of engagement with the ribbon, but when the spring is pressed inward by the user, the stud, which can be of rubber or other suitable material, engages frictionally with the tape 8 and holds it motionless.

The implement can be equipped with another web 6 affixed to the casing and the opposite side edge of the guide 5 if desired.

The implement can easily be operated and readily handled in practice; and the ribbon can be as long as is required. Also the device can be quickly repaired when necessary. Since the ribbon has no numbers marked thereon, the reading cannot be obscured by dirt or dust. If any foreign substances should adhere to the ribbon they will always be dislodged when the ribbon is returned to the casing either at the outer end of the guideway or in passing the aperture 12.

The invention is thus well adapted to serve its intended purpose.

Having described my invention what I believe to be new is:

A measuring implement having a circular casing, an elongated ribbon therein, a reel to which the inner end of the ribbon is secured rotatably supported in the casing, a spring attached to the reel and the inside of the casing to retract the ribbon, said ribbon having perforations spaced apart throughout its length, the casing having an opening for said ribbon to enable the ribbon to be drawn forth, a flat tubular guide for the ribbon affixed in tangential position to the outside of the casing adjacent said opening and projecting from the casing, a wheel rotatably supported on the casing adjacent said guide, said wheel rotatably supported on the casing adjacent said guide, said wheel having spur projections on its rim and the guide in one side having an opening presented to the wheel to expose part of said ribbon so that said projections can enter said perforations and the wheel can be turned by the ribbon in its longitudinal movement, the guide having on its opposite side a convex bulge adjacent the opening conforming to the rim of said wheel, and an indicator on the casing connected to said wheel, the casing also having a web uniting the guide to said casing, said wheel and indicator being carried by said web, a curved guard projecting laterally from the web for said wheel, the guide also having an aperture in said opposite side between the bulge and the casing, a stud in said aperture, an elastic member carrying said stud secured to the opposite side of said guide to be pressed and move the stud into contact with the ribbon and hold the ribbon against retraction by the spring.

References Cited in the file of this patent

UNITED STATES PATENTS

| 78,399 | Shotwell | May 26, 1868 |
| 130,120 | Finley | Aug. 6, 1872 |
| 1,237,808 | Ottinger | Aug. 21, 1917 |
| 2,706,336 | Gruber | Apr. 19, 1955 |

FOREIGN PATENTS

| 15,101 | Great Britain | June 28, 1911 |
| 203,958 | Great Britain | Sept. 20, 1923 |
| 116,845 | Switzerland | Nov. 1, 1926 |